April 22, 1969   R. E. SCHOTT ET AL   3,439,709
HYDRAULIC DRAFT CONTROL VALVE

Filed April 17, 1967   Sheet 1 of 2

Inventors
Robert E. Schott
Gerald W. Bernhoft
By [signature]
Attorney

April 22, 1969  R. E. SCHOTT ET AL  3,439,709
HYDRAULIC DRAFT CONTROL VALVE
Filed April 17, 1967

Inventors
Robert E. Schott
Gerald W. Bernhoft
Attorney

United States Patent Office 3,439,709
Patented Apr. 22, 1969

1

3,439,709
HYDRAULIC DRAFT CONTROL VALVE
Robert E. Schott, New Berlin, and Gerald W. Bernhoft, Wauwatosa, Wis., assignors to Allis-Chalmers Manufacturing Company, Milwaukee, Wis.
Filed Apr. 17, 1967, Ser. No. 631,238
Int. Cl. B60d 7/00
U.S. Cl. 137—596.13                                    5 Claims

ABSTRACT OF THE DISCLOSURE

A hydraulic draft control valve providing flow rate as a function of spool displacement and a variable dampening means to control the time delay of a switch valve actuation. The draft control valve has by-pass means operated in response to the switch valve which is pressure responsive.

This invention relates to a hydraulic system and more particularly to a draft control valve for sensing draft loads and controlling fluid displacement for actuation of a fluid actuator.

To provide the maximum efficiency and to deliver maximum output from the tractor it is necessary that the tractor be used at its rated load for the greatest period of time. It is understood that the ground conditions vary causing a difference in the friction underneath the tractor wheels which may limit the draft load. To maintain a certain minimum drawbar pull on the vehicle regardless of ground conditions it is necessary that some means be provided for maintaining a predetermined minimum tractive pull. Accordingly, a sensing device is used which senses the draft load drawn by the tractor and when an increase in load is applied to the drawbar the increased draft load is sensed and a compensating means provides for redistribution of the weight on the tractor wheels and the implement. With an increase in draft load the weight is shifted from the implement to the rear wheels of the tractor providing a greater traction force for driving the tractor forward.

Accordingly, this invention is intended to provide such a hydraulic control in a hydraulic system adapted for use with this type of vehicle. It is understood that the hydraulic system will also operate manually to provide lifting and positioning of the implement when it is desired to raise the implement to a travel position, or preselected position. This invention provides a draft control valve which controls the rate of fluid displacement and also the time delay for actuating the control valve. This is necessary when the soil conditions are of a rocky nature, a slight increase in drawbar pull may cause a lifting of the implement which would be undesirable since the implement itself if allowed to remain in the ground will often shift and maneuver itself around the obstacle. Accordingly, a delay is built into the hydraulic draft control valve which may be adjusted to provide satisfactory operation in various types of soil conditions.

It is an object of this invention to provide the hydraulic draft control valve.

It is another object of this invention to provide a hydraulic draft control valve having a time delay for delaying the lift force applied to the implement in transferring additional weight to provide increased traction force on the tractor wheels.

It is a further object of this invention to provide a hydraulic draft control valve wherein rate of fluid displacement is a function of the spool displacement in the valve and a dampening means is provided on the valve to provide a delay in fluid displacement applied to the fluid actuator.

2

It is a further object of this invention to provide a hydraulic draft control valve having a variable dampening means to provide a time delay in valve actuation and a sensitive response to a change in draft load to return the valve to its original position in response to reversion of the draft load to its original magnitude.

The objects of this invention are accomplished by providing a hydraulic draft control valve which includes a bypass valve which bypasses the major portion of pressurized fluid to the reservoir under normal draft conditions. A flow divider valve is operated in response to changing draft conditions which diverts the major portion of the pressurized fluid through the bypass valve under normal draft load conditions. The flow divider valve diverts a slight amount of pressurized fluid to a switch valve which returns this fluid to the reservoir under normal draft conditions. When an increase in draft load is sensed the spool on the flow divider valve opens a passage to allow a portion of pressurized fluid to enter a pressure chamber biasing a normally open switch valve to a closed position and causing a portion of pressurized fluid to be directed to the fluid actuator. The bypass valve is biased to a closed position in response to an increase in pressure of the pressurized fluid pasing to the fluid actuator. The actuation of the switch valve, however, is delayed since the fluid passing to the pressure chamber from the spring chamber is restricted. This time delay is variable and can be adjusted sufficiently to cause a hesitation in the lifting of the implement and allow sufficient readjustment to the soil conditions for the implement to move around the obstacle. This delay in time is often sufficient to allow the implement to bypass the obstacle and return the draft load to that required under normal condition.

The restrictive passage means intermediate the spring chamber and the pressure chamber includes a means for varying the degree of restriction and the rate of flow from the spring chamber to the pressure chamber which provides an adjustment which may be manually set to accommodate varying soil conditions encountered by the implement.

A second hydraulic circuit intermediate the spring chamber and pressure chamber bypassing the power wall which forms a portion of the switch valve includes a unidirectional valve such as a check valve which permits fluid to flow from the pressure chamber to the spring chamber when the increased draft load is overcome and the draft load returns to normal. Accordingly, the power wall will move in response to the force from the spring within the spring chamber to open the switch valve when the flow divider valve opens the passage from the switch valve to the reservoir.

The preferred embodiments of this invention are disclosed in the attached drawings and will be described in the following paragraphs.

Figure 1:
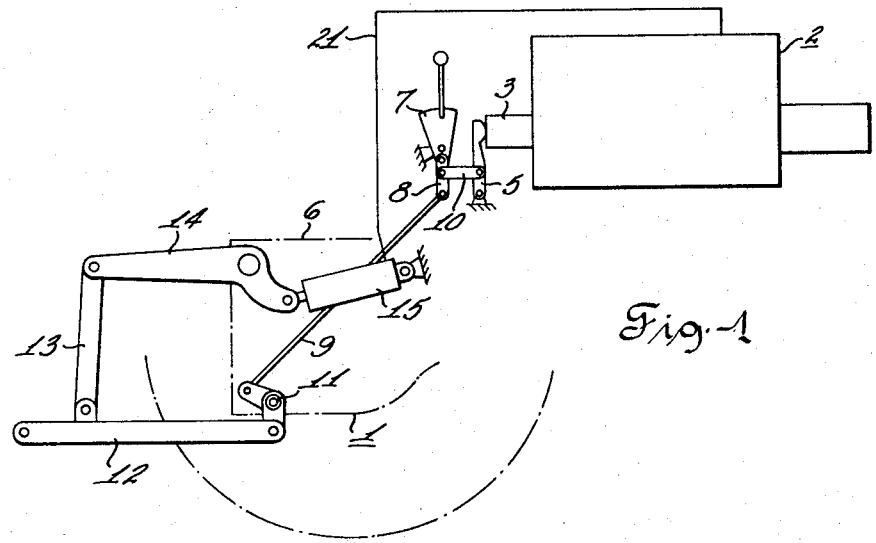
FIG. 1 is a schematic illustration of the application of the draft control valve in a hydraulic system on a tractor.
Figure 4:
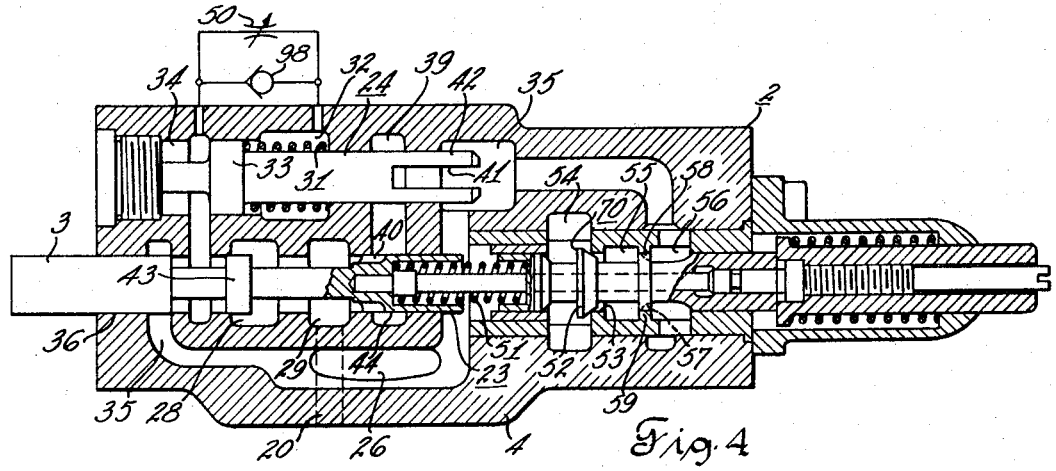
FIG. 4 is a cross section view taken along line IV—IV of FIG. 3 of the draft control valve showing the flow divider valve and the switch valve with the unidirectional valve and the variable restrictive passage.

Referring to FIG. 1 the tractor 1 is shown in phantom view having portions of the frame or chassis shown for mounting the various parts of the hydraulic system. The hydraulic draft control valve 2 is positioned on the tractor and has a spool 3 which moves reciprocally within the housing 4 as shown in FIG. 4. An arm 5 is pivotally supported on the chassis 6. A hand lever 7 is also pivotally supported on the chassis 6. A link 8 interconnects the rod 9 and the lever 7. A midpoint of the link 8 is pivotally connected to a push rod 10 which is also connected to the intermediate portion of the lever 5. The spool 3 is actuated in response to pivotal movement of the lever 5. The lever 5 may be actuated by the hand lever 7 when the implement is lifted to the travel position or may be automatically actuated in response to movement of the rod 9. The rod 9 is actuated by a sensor 11 pivotally supported on the chassis 6. The sensor 11 is connected to the draft arms 12. The draft arms connect to the implement which is being drawn by the tractor 1. The pair of lift links 13 are connected to an intermediate point on the draft arms 12 and on their opposite ends to a bell crank 14 which is actuated by a fluid actuator 15. The fluid actuator 15 may be a hydraulic cylinder receiving pressurized fluid for reciprocal movement in one direction in response to the force of the pressurized fluid. The piston in the hydraulic cylinder 15 will move in response to the weight of the implement when the system releases the pressure in the hydraulic actuator 15.

Figure 2:
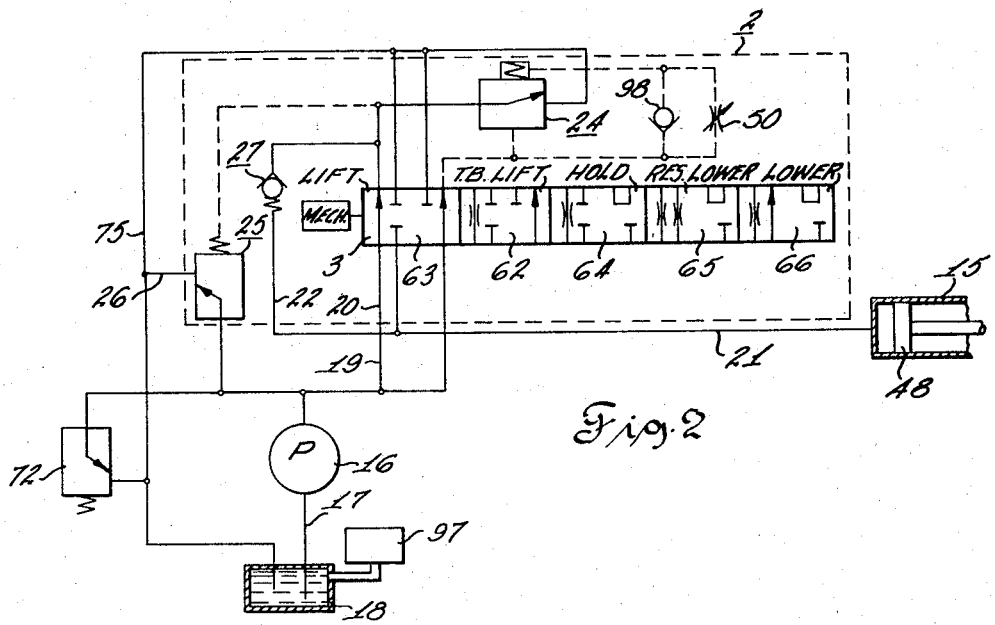
FIG. 2 is a schematic illustration of the hydraulic circuit and the hydraulic draft control valve schematically illustrated.

Referring to FIG. 2 the hydraulic system is illustrated schematically. The fluid actuator 15 is actuated by this system. A variable or fixed displacement fluid pump 16 is driven by the power from the tractor and is in operation when the engine of the tractor is running. A conduit 17 is in communication with the reservoir 18 which contains a supply of low pressure hydraulic fluid. The pump 16 pressurizes fluid and forces the pressurized fluid into the conduit 19 which enters the draft control valve 2 in an inlet passage 20 as shown in FIG. 2. The conduit 21 receives pressurized fluid from the outlet passage 22 in the draft control valve 2. The draft control valve 2 also has an outlet passage 26 which is connected to the conduit 75 which returns to the reservoir 18.

Referring to FIG. 4 a cross section of the draft control valve is illustrated. The flow divided valve 23 and the switch valve 24 are illustrated in cross section.

Figure 5:
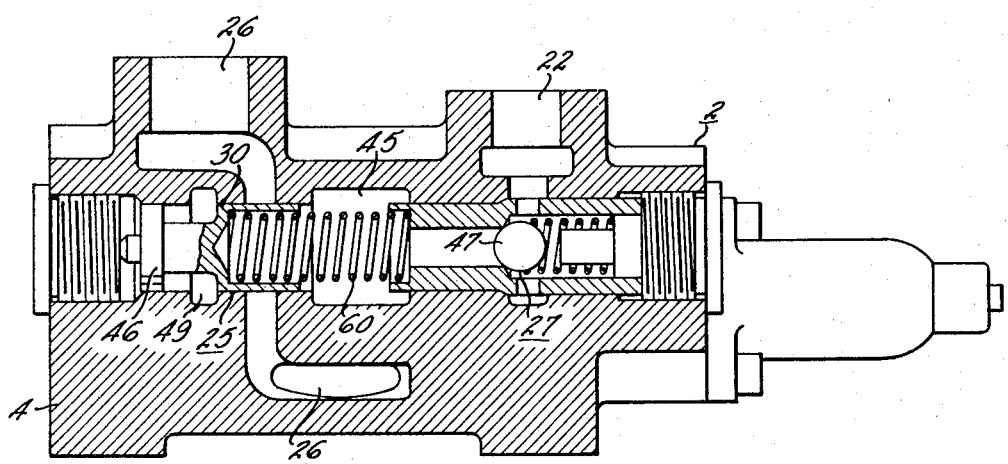
FIG. 5 is a cross section view taken along line V—V of FIG. 3 of the hydraulic draft control valve showing the bypass valve portion in cross section.
Figure 3:
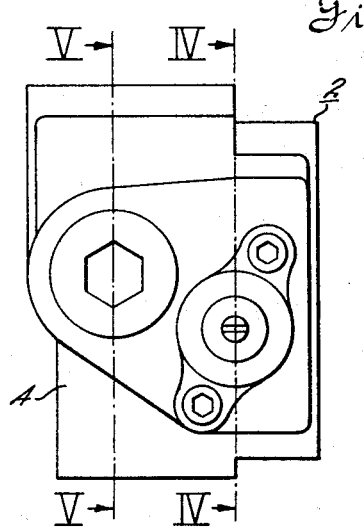
FIG. 3 is an end view of the hydraulic draft control valve.

FIG. 5 illustrates the bypass valve 25 and the outlet passage 26 which is in communication with the conduit 75 which returns to the reservoir. The outlet passage 22 is connected through the check valve 27 to the flow divided valve 23.

When the spool 3 of the flow divider valve 23 is in the position shown in FIG. 4 the major portion of the pressurized fluid received in the inlet passage 20 is bypassed through the bypass valve 25 and returned to the reservoir.

FIG. 4 illustrates the flow divider valve 23 and the switch valve 24 in their respective positions when the hydraulic draft control valve is in its neutral position. The hydraulic fluid enters the inlet passage 20 and chamber 28. Chamber 28 is in communication with chamber 29 as shown in FIG. 4. The bypass valve 25 in FIG. 5 is shown in its shut-down position. The valve element 30 of the bypass valve is hydraulically biased to a right-hand position and the bypass valve 25 is normally open and permits the flow of pressurized fluid out of chamber 29 through chamber 49 to the outlet passage 26 and to return through the conduit 75 to the reservoir 18. When the hydraulic draft control valve is in its neutral hold position a substantial portion of the pressurized fluid is bypassed through the bypass valve 25 to the reservoir. The switch valve 24 is in a position as shown because the spring 31 in the spring chamber 32 biases the piston 33 to a left-hand position as shown. The fluid in the pressure chamber 34 will flow into the passage 35 which is in communication with outlet passage 26. The land 36 of spool 3 will release the pressure in chamber 34 with a slight left-hand movement from the position shown in FIG. 4.

Figure 6:
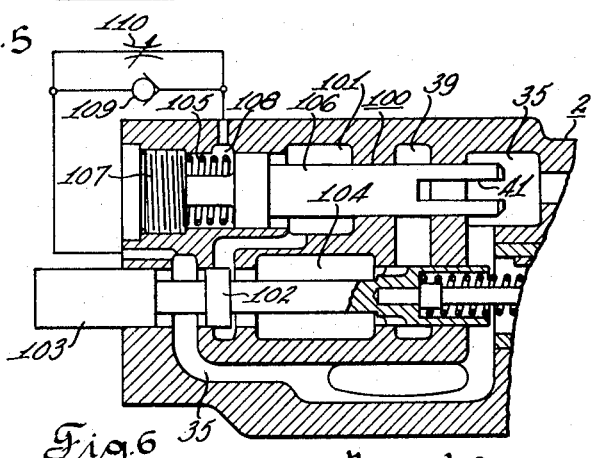
FIG. 6 is a fragmentary cross section view showing a modification at the switch valve.

FIG. 6 illustrates a modification of the switch valve which is effectively a reversal of parts of the valve shown in FIG. 4. The switch valve 100 is normally biased to an open position as shown by pressurized fluid in the pressure chamber 101. The land 102 of the spool 103 as shown permits communication between chamber 104 and chamber 101. The spring 105 is compressed and the end of the valve element 106 engages the plug 107 when the switch valve is in its completely open position.

As the spool 103 moves to the right the land 102 blocks communication between chamber 104 and chamber 101. With a further right-hand movement of spool 103 chamber 101 is vented to the passage 35 which is in communication with the reservoir through passage 26. The spring 105 will then bias the valve element 106 to close communication between chamber 39 and chamber 35. The movement of the valve element is retarded to a partial vacuum in the spring chamber 108. The partial vacuum in the spring chamber is gradually released as hydraulic fluid passes through the variably restricted orifice 110. The delay in movement of the valve element 106 delays the actuation of the actuator 15.

As the draft load decreases the spool 103 is permitted to move in the left-hand direction thereby blocking communication between the pressure chamber 101 and passage 35. Further movement of the spool 103 causes land 102 to again permit communication between the chamber 101 and chamber 104. The fluid in the spring chamber 108 rapidly flows through the check valve 109 to the passage 35 and the reservoir.

Referring to FIG. 4 the chamber 28 is in communication with chamber 39 through the restricted passages formed by the metering grooves 40. When the switch valve is in the position shown in FIG. 4 the slot 41 of valve stem 42 permits the flow of fluid from chamber 39 to chamber 35 which is vented to the reservoir through passage 26.

The land 43 on spool 3 controls the flow of pressurized fluid into the pressure chamber 34. The land 44 is formed with the metering grooves 40 in the left end to permit the metering of pressurized fluid to chamber 39 and with further displacement of the spool in the right-hand direction the chamber 29 will be in communication with chamber 39. At this point the land 43 will permit pressure fluid to enter the pressure chamber 34 causing the piston 33 and stem 42 of the switch valve to move to the right causing the slot passage 41 to close. At this point pressurized fluid will freely enter the chamber 39 which is in communication with the chamber 29. The fluid in chamber 45 biases the valve element 30 to move to a left-hand position tending to close the bypass valve 25 and the increase in pressure within chamber 45 will unseat the ball 47 from the seat in the ball check valve 27. When the ball 47 unseats from its mating seat pressurized fluid will pass through the outlet passage 22 through conduit 21 to the fluid actuator 15. This will cause the piston 48 and linkage to lift the implement. The rate of lift is determined by the degree of movement of the spool 3 in its right hand movement. If only the metering slots 40 provide the communication between the chambers 29, 39, and 45 then the lifting will be at a slower rate than with a full opening communication provided between these chambers. There is a delay, however, built into the switch valve which is shown in FIG. 4. With an initial surge of pressurized fluid into the pressure chamber 34 the piston 33 is biased to move to a right-hand position against the force of the spring 31. Fluid within the spring chamber 32, however, prevents a rapid movement of the piston 33. Fluid in the spring chamber 32 must be displaced through the restricted orifice 50 as the piston moves to the right. The restricted fluid movement causes a limited time delay before the switch valve 24 can close. If the draft load continues to increase sufficient fluid will be displaced from spring chamber 32 to the pressure chamber 34 as the piston 33 moves to the right and the valve stem 42 causes the slot passage 41 to close.

If the increase in draft load is of such a nature that the flow divider valve spool 3 moves to the right to provide free communication between the chamber 29 and the chamber 39 the rate of fluid flow into chamber 45 will be so high that the bypass valve will move to the left and the ball check valve 27 will open permitting a rapid flow of substantially all the fluid through the outlet passage 22 to actuate the fluid actuator 15.

When the draft load is released and returns to normal the spool 3 will move to the left in response to a biasing force from the spring 51. This will cause the land 43 on spool 3 to close the passage to the pressure chamber 34. The continued movement of the lever 5 will permit the spool 3 to move farther to the left unseating the poppet valve element 52 from its mating valve seat 53. This permits return of pressurized fluid through the outlet passage 22 to chamber 54 to the chambers 55 and 56 which are in communication with the chamber 35 which is vented to the reservoir.

The hydraulic fluid returning through the chamber 54 passes by the poppet valve and is metered by metering grooves 57 on the land 58. A continued left-hand movement of the spool 3 causes the land 58 on the spool 3 to clear the restricted portion 59 in the housing 4. This permits a rapid lowering of the implement as there is no restriction to the return flow of pressurized fluid from the hydraulic actuator 15.

The operation of this device will be described in the following paragraphs.

Under normal operating conditions the draft arms 12 are pulling a relatively constant draft load. When a sudden increase in the draft load is applied to the draft arms 12 this increased load is sensed by a sensor 11 and transmitted through the rod 9 of the lever 8. Lever 8 is connected to lever 5 by means of the link 10 which transmits the movement to the spool 3 biasing the spool to the right-hand direction as shown in FIGS. 2 and 4. Prior to the increase in load operation the switch valve 24 is biased to a left-hand position as shown in FIG. 4 with the slot passage 41 open and venting any pressurized fluid in chamber 39, chamber 35, and outlet passage 26 to the reservoir. Pressurized fluid entering the inlet passage 20 is also bypassed through the bypass valve 25 and the outlet passage 26 and conduit 75 to the reservoir 18. No fluid passes through the check valve 27 when the spool is in the left-hand position. As the lever 5 biases the spool to the right-hand direction the metering grooves 40 permit a limited flow of pressurized fluid to chamber 39 which is bypassed through the slot passage 41 to the reservoir. With the further movement of the spool 3 the land 43 unseats from the mating opening in the housing 4 and permits pressurized fluid from the chamber 28 to flow into the pressure chamber 34 causing the piston 33 to move in the right-hand direction. The piston 33 is retarded due to the fact that the spring chamber 32 contains hydraulic fluid which is compressed and forced to pass through the restricted orifice 50 which delays the right-hand movement of the piston 33. This in turn delays the closing of the slot passage 41 in the valve stem 42.

With a pressure build-up in chamber 39 caused by the pressurized fluid passing through the metering grooves 40 the pressure simultaneously builds up in chamber 45 which is in direct communication with chamber 39. Simultaneously with a build-up in the chamber 45 the check valve 27 opens causing pressurized fluid to flow out of the outlet passage 22 to the fluid actuator 15. The valve element 30 of the bypass valve 25 is caused to move to the left which tends to close the bypass valve in response to the biasing force of the spring 60 and the pressurized fluid in chamber 45. The greater the increase in pressurized fluid in chamber 45 the greater the displacement of the bypass valve element 30. The force differential between the chamber 45 and chamber 49 is equal to this biasing force of spring 60. The spool 3 of the flow divider valve 23 continues to move in the right-hand direction. The bypass valve 25 will close completely diverting all the pressurized fluid through the check valve 27 and out of the outlet passage 22 to the fluid actuator 15. The flow of the pressurized fluid into the fluid actuator 15 will cause the implement to lift completely to its raised or travel position. The implement will remain in its raised position so long as there is pressurized fluid in the fluid actuator 15.

A similar operation may be accomplished by moving the hand lever 7 which actuates the spool 3 of the flow divider valve 23. Movement of the hand lever 7 may be controlled to operate at any rate desired. If the hand lever is moved to a position to move the spool 3 completely to the right the rapid flow of the pressurized fluid to the fluid actuator will override the effect of the switch valve and cause the implement to lift as rapidly as desired.

Referring to FIG. 2 the traction boost lift position for the spool 3 is shown on the diagram and also the lift position is shown. The traction boost lift is shown schematically at 62 and the lift position is shown at 63.

The hold position in the schematic diagram is shown by the position 64. The restrictive lower position is shown by 65 and the lower position by 66. When the implement is lowered the spool 3 is moved to the left causing an opening of the poppet valve 70 permitting the flow of pressurized fluid back to the reservoir.

When pressurized fluid is passing through the passage 22 to the fluid actuator 15 the implement is being raised. If the implement is fully raised the pressurized fluid can no longer pass through to the actuator 15 and accordingly the pressure release valve 72 wil provide a safety valve for the pressurized fluid being pumped by the pump 16. The implement remains raised so long as the check valve 27 is closed and the poppet valve 70 is closed. These two valves control the inlet and outlet to the hydraulic actuator 15.

FIG. 4 illustrates the neutral position for the hydraulic draft control valve. This is also the hold position when the implement is in its raised position. The spool 3 is positioned in such a manner that the poppet valve 70 is closed and the ball check 27 is closed. If the spool 3 has been returned from the lift or traction boost lift position then the implement will be raised and will remain in a raised position until the poppet valve 70 is opened. This is accomplished by a further left-hand movement causing the poppet valve 70 to open. The metering grooves 57 on the spool 58 will meter the flow of fluid through the chambers 54, 55, and 56. The metered flow will return the fluid from the fluid actuator 15 to reservoir 18. Movement of the spool to the left causes the pressure chamber 34 to be vented to the passage 35 and pressure no longer exists in chamber 34 and the switch valve 24 returns to its left-hand position placing communication through the slot passage 41 from the chamber 39 to the reservoir. In this position the implement is lowered at a slower rate.

A further left-hand movement of the spool 3 will cause the poppet valve 70 to open wider and the metering orifices 57 are no longer effective as the passage between chambers 55 and 56 will be open and the implement will lower rapidly. This position is indicated by position 66 on the schematic diagram.

With the return of the piston 33 to its retracted position as shown in FIG. 4 the fluid in the pressure chamber 34 will bypass the piston 33 and flow into the pressure chamber 32 through the check valve 98. This permits the piston 33 to move to the left and open the passage 41.

With a return of the switch valve 24 to its normal position as shown in FIG. 4 the bypass valve 25 will also return to its normal position. The bypass valve returns to the position to permit the return flow of pressurized fluid to the reservoir. The metering grooves 40 on the land 44 close to prevent any further communication with the chamber 29 and chamber 39. In this position any pressurized fluid in chambers 39 and 45 are vented through the slot passage 41 to the reservoir. This permits the force of the pressurized fluid acting in chamber 49 to bias the valve element 30 of the bypass valve 25 to open position to permit the return flow of pressurized fluid to the reservoir.

The preferred embodiments of this invention have been illustrated and described. The scope of this invention is defined in the attached claims.

The embodiments of the invention in which an exclusive property or privilege is claimed are defined as follows:

1. A hydraulic draft control valve comprising, means defining an inlet passage means adapted for connection to a source of pressurized fluid, means defining a first outlet passage means adapted for connection to a fluid reservoir, means defining a second outlet passage means adapted for connection to a fluid actuator, a flow divider valve connected to said inlet passage means for dividing the flow of pressurized fluid into a first portion and a second portion, a bypass valve connected between said flow divider valve and said first outlet passage means for bypassing the first portion of pressurized fluid to the reservoir, a switch valve connected intermediate said flow divider valve and said first outlet passage means normally biased to an open position for passing the second portion of pressurized fluid to said first outlet passage means, a unidirectional valve connected between said flow divider valve and said second outlet passage means, a switch valve actuating means defining a variable volume pressure chamber selectively connected to said flow divider valve for causing said switch valve to close in response to actuation of said flow divider valve biasing said switch valve to a closed position for directing flow of pressurized fluid through said unidirectional valve, a flow restricting means connected to said variable volume pressure chamber for restricting fluid flow responsive to a change in volume of said variable volume pressure chamber for delaying the closing of said switch valve to thereby delay actuation of said fluid actuator.

2. A hydraulic draft control valve as set forth in claim 1 wherein said switch valve actuating means includes a power wall defining said variable volume chamber and another variable volume chamber, said restrictive passage means is connected to said variable volume chambers to restrict the flow between said chambers for delaying the closing of said switch valve.

3. A hydraulic control valve as set forth in claim 1 wherein said switch valve actuating means includes a power wall defining said variable volume chamber and another variable volume chamber in communication with each other through a variable restrictive passage means and a second passage having a second unidirectional valve, said variable restrictive passage restricting the flow of fluid to delay the closing of said switch valve and said second unidirectional valve providing free communication between said chambers to permit rapid opening of said switch valve.

4. A hydraulic draft control valve as set forth in claim 1 wherein said switch valve actuating means defines said variable volume pressure chamber for receiving pressurized fluid from said flow divider valve in response to actuation of said flow divider valve for biasing said switch valve to a closed position.

5. A hydraulic draft control valve as set forth in claim 1 wherein said switch valve actuating means includes a power wall defining a variable volume pressure chamber normally receiving pressurized fluid from the source of pressurized fluid for biasing said switch to an open position and said switch valve is closed in response to actuation of said flow divider valve blocking communication of said pressure chamber with the source of pressurized fluid.

References Cited
UNITED STATES PATENTS

| | | | |
|---|---|---|---|
| 3,267,961 | 8/1966 | Rice | 137—596 |
| 3,363,649 | 1/1968 | Schott | 137—596.12 |

HENRY T. KLINKSIEK, *Primary Examiner.*